United States Patent [19]
Pfau et al.

[11] 3,912,898
[45] Oct. 14, 1975

[54] PROCESS FOR CHECKING AND ADJUSTING THE OPERATION OF AN ELECTRO-EROSION MACHINING APPARATUS

[75] Inventors: Jean Pfau, Geneva; Heinz Rhyner; Georges-Andre Marendaz, both of Meyrin-Geneva, all of Switzerland

[73] Assignee: Ateliers des Charmilles, S.A., Geneva, Switzerland

[22] Filed: Apr. 11, 1974

[21] Appl. No.: 459,931

Related U.S. Application Data

[63] Continuation of Ser. No. 320,507, Jan. 2, 1973, abandoned.

[30] Foreign Application Priority Data
Jan. 5, 1972 Switzerland............................ 152/72

[52] U.S. Cl........... 219/69 M; 219/69 D; 219/69 G; 219/69 V
[51] Int. Cl.².......................................... B23P 1/08
[58] Field of Search.... 219/69 M, 69 S, 69 D, 69 G, 219/69 Y

[56] References Cited
UNITED STATES PATENTS

| | | | |
|---|---|---|---|
| 3,662,143 | 5/1972 | Davis | 219/69 S |
| 3,670,136 | 6/1972 | Saito et al. | 219/69 S |
| 3,699,303 | 10/1972 | Kauffman | 219/69 D |
| 3,705,286 | 12/1972 | Kondo et al. | 219/69 S |
| 3,739,136 | 6/1973 | Maueudaz | 219/69 M |
| 3,825,713 | 7/1974 | Bell | 219/69 S |

*Primary Examiner*—Bruce A. Reynolds
*Attorney, Agent, or Firm*—Hauke, Patalidis & Dumont

[57] ABSTRACT

Process and apparatus for monitoring and adjusting the operation of an electro-erosion machining apparatus comprising monitoring at least two machining parameters and, upon detecting faulty operation of any one of the parameters, initiating a predetermined program of corrective measures, and continuously checking the operation of the apparatus after each correction, until monitoring of the parameters indicates the absence of any faulty operation in each of the selected parameters.

8 Claims, 3 Drawing Figures

PROCESS FOR CHECKING AND ADJUSTING THE OPERATION OF AN ELECTRO-EROSION MACHINING APPARATUS

CROSS REFERENCE TO RELATED APPLICATION

The present application is a continuation of application Ser. No. 320,507, filed Jan. 2, 1973, and now abandoned, claiming the priority of application Ser. No. 152 filed in Switzerland on Jan. 5, 1972.

BACKGROUND OF THE INVENTION

Electro-erosion machining apparatus of the EDM (electrical discharge machining) type comprise generally a generator for supplying voltage pulses of a predetermined frequency across an electrode and a workpiece to cause electrical discharges to take place across the gap between the electrode and the workpiece through a dielectric fluid. EDM machines are provided with diverse controls which can be manually set by the machine operator according to certain desirable machining parameters or adjustments. Such adjustments generally relate, for example, to the distance, or work gap, to be maintained between the electrode and the workpiece, to the flow rate of dielectric fluid through the work gap, to the average current density through the work gap, to the duration of the electrical pulses, and to the operation of an intermittent electrode retracting device.

The operation of an EDM machine requires a certain amount of skill and experience on the part of the machine operator, and even a very experienced machine operator has some difficulties in adjusting and controlling the machine for achieving the most efficient combination of the conditions of operation which permits, for example, obtaining the highest rate of material removal compatible with the desired surface finish of the machined portions of the workpiece. The present invention allows achieving in a short time the most efficient set-up and adjustment for an EDM machine, even though the machine operator may lack skill and experience.

The present invention enables the operator of an EDM machine to monitor at least two of the critical machining parameters corresponding to the following conditions:

a. presence or absence of abnormal electrical discharges;

b. presence or absence of contamination of the dielectirc fluid beyond a predetermined rate; and c. presence or absence of short circuits in the work gap; and to initiate a predetermined program of corrective measures as a function of the results observed in the course of the monitoring. After each program of corrective measures is concluded, the monitoring of the operation parameters is repeated, followed by repetition of the program of corrective measures as long as the monitoring indicates the presence of an abnormal operation of the machine.

With respect to the parameter (a) mentioned hereinbefore, it should be emphasized that an abnormal electrical discharge is an electrical discharge which is considered as being abnormal in view of the particular aspect of the voltage and/or current curve through the work gap. Such an abnormal voltage and/or current curve is different from the abnormal voltage and/or current curve observed as a result of contamination of the dielectric fluid which causes a resistive bridging of the work gap, and it is also different from the abnormal voltage and/or current curve observed as a result of a short circuited work gap which causes the voltage between the electrode and the workpiece to fall to a value generally comprised between 0 and 5 volts. Abnormal electrical discharges according to the parameter (a) hereinbefore may take the appearance, for example, of high frequency oscillations below the normal voltage value of the electrical discharges, or of an absence of variation of the gap voltage in the course of two successive discharges, or of an absolute value of the machining voltage different from the normal nominal value of the machining voltage.

SUMMARY OF THE INVENTION

The principal object of the invention, therefore, is a method and apparatus for monitoring the conditions of operation of an electro-erosion machining apparatus, for detecting abnormal operation of the apparatus, and for subjecting the operation of the apparatus to a program of corrective measures as a function of the detected abnormal conditions.

This object, and other objects and advantages of the present invention, will become apparent to those skilled in the art when some of the best modes contemplated for practicing the invention is read in conjunction with the accompanying drawing wherein examples of apparatus for practicing the invention are illustrated.

DETAILED DESCRIPTION OF THE PREFERRED EMBODIMENTS

Figure 1:
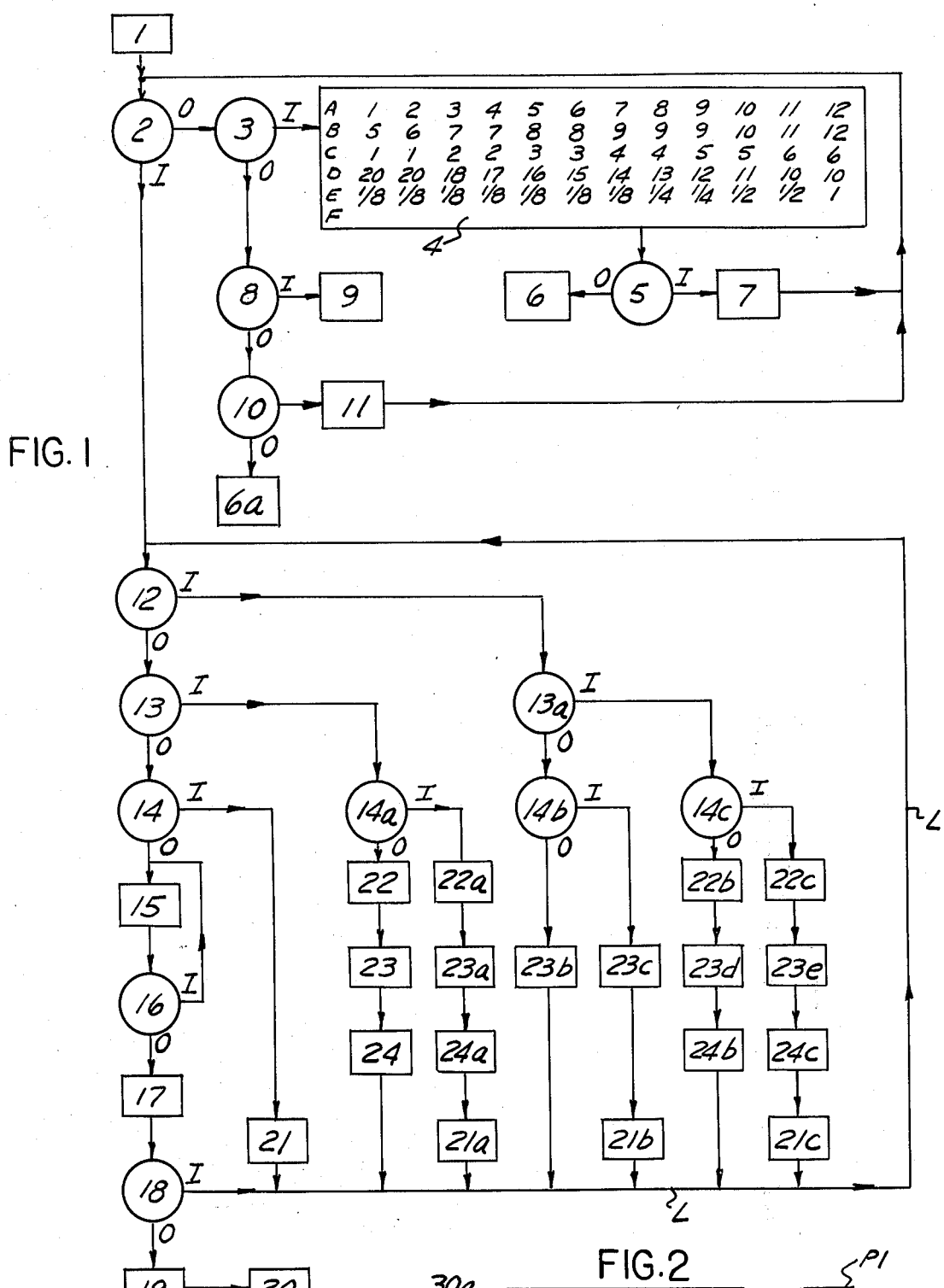
FIG. 1 is a schematic diagram of an example of embodiment of the present invention.

FIG. 1 schematically illustrates a practical example of a graphic diagram which may take the form of a plate or panel mounted on an EDM apparatus such as to be accessible to the machine operator. The panel is provided with a plurality of graphic representations, each corresponding to a particular control of the apparatus and to particular settings or adjustments to be effected by the operator. In the example illustrated, the graphic representations are in the form of blocks which are interconnected by arrowed lines, and the operator is instructed to start from an original block, which is identified as block 1, to follow an arrowed line and to sequentially effectuate the particular controls or the particular adjustments corresponding to each one of the blocks encountered while following the arrowed line. To simplify the understanding of the diagram, each block corresponding to a control or check operation is represented by a circle, and each block corresponding to an adjustment or correction to be effected by the operator is represented by a rectangle. Each circular block, corresponding to a particular control or check, is provided with two separate outputs, designated respectively by O and I. O corresponds to a negative answer, and I corresponds to a positive answer to the check effected by the operator.

Thus, starting from block 1, the arrowed line leads the operator to a circular block 2 which corresponds to a question such as: "Is the apparatus machining the workpiece or not?" If the operator observes that the machine removes material from the workpiece, (yes answer), he must take the output I from the circular block 2 and proceed along the arrowed line to a circle designated 12 in the diagram. On the other hand, if the operator observes that there is no material removal from the workpiece, he must follow the arrowed line from the output O of the circular block 2 which leads to a circular block 3. The circular block 3 corresponds to a question: "Is this a new machining operation?" If the answer is in the affirmative, the output I from the circular block 3 leads to a table 4 bearing indicia relative to the different adjustments which must be effected prior to starting the machine. The proper combination of diverse adjustments is dependent principally on the type of machining selected. For example, it is dependent on whether a rough machining of the workpiece is effected or whether, in the contrary, a finish cut is effected.

In the example illustrated, the table 4 is provided with a series of numbers disposed along lines A, B, C, D and E. The numbers on the line A correspond to similar numbers disposed on the dial of the pulse duration adjustment control knob of the machine. In the example illustrated, the numbers at line A are consecutive numbers from 1 to 12 and they correspond to progressively increasing machining pulse durations. The numbers at line B of table 4 correspond to the indicia on the knob of the control relative to the time lapse from the end of a pulse to the beginning of the next pulse, this time lapse increasing according to numbers from 5 to 12.

Line C of the table 4 bears numbers corresponding to those on the servo mechanism control of the machine, which in turn represent each a predetermined distance to be maintained between the electrode and the workpiece, or work gap. This distance, or work gap, is arbitrarily represented by numbers increasing in steps from 1 to 6 which correspond to increasing work gaps.

Line D of table 4 represents, by way of numbers decreasing from 20 to 10, decreasing values of the pressure of the dielectric fluid flowing through the work gap, and those numbers correspond to the indicia on the control of the fluid flow rate.

Line B of table 4 bears a series of fractional numbers, from ⅛ to 1, which represent fractions of the maximum power of the EDM machine power supply, and those fractions correspond to similar indicia on the machine power adjustment control.

Below the lines A through E of table 4 there is a blank line designated by the letter F which corresponds to the operation of a device designated generally as a pulsator or electrode retracter which periodically retracts the electrode from the workpiece. The adjustment of the pulsator is not indicated on the line F, because it depends not only on the selected conditions of machining, but on other additional parameters such as, for example, the amount of projection of the electrode within the workpiece and the surface area of the machined zone. According to the conditions of operation and the above mentioned parameters, the pulsator may be activated or left out of operation.

After having adjusted the diverse controls corresponding to those listed on table 4 to appropriate settings corresponding to a single vertical column on table 4, which, in combination, permit to achieve the degree of machining quality desired, the operator follows the arrowed line leading from the table 4 to a circular block 5 corresponding to "whether or not machining of the workpiece is effected." An answer in the negative leads from the output O of the circular block 5 to a rectangular block 6 instructing the operator to check diverse essential elements of the machine or conditions of operation such as, for example, the level of dielectric fluid in the machining tank being adequate, the temperature of the dielectric fluid being within limits, that the hydraulic servo system pumps and the dielectric fluid circulation pumps have been started and are functioning properly, and that all the safety interlocks, which otherwise would prevent starting the machine, are properly engaged.

In the event that the answer to the question asked by circular block 5 is in the affirmative, taking the output I from the circular block 5 leads to the rectanglar block 7 which instructs the operator to progressively increase the power (line A of table 4) until the chosen value is finally reached. The output from the rectangular block 7 leads back to the circular block 2 and to the output I of the circular block 2 because having gone through the rectangular block 7 results in the assumption that machining is being effected.

Returning once again to the start of the diagram of FIG. 1, in the event that the answer to the question asked by the circular block 2 is in the negative, that is that no machining is being effected, the output O from the circular block 2 leads to the question asked by the circular block 3, i.e. whether or not it is a "new machining operation." In the event that the answer to that question is in the negative, the output O from the circular block 3 is followed, therefore leading to the circular block 8 asking the operator to check whether a malfunction indicator light is "on" or "off."

If the malfunction indicator light is on, the output I from the circular block 8 leads to the instruction rectangular block 9 instructing the operator to call a serviceman. If the malfunction indicator light is off, the output O from the circular block 8 leads to the circular block 10 asking the operator to observe whether or not an abnormal discharge indicator light is on. In the event that the abnormal discharge indicator light is on, the output I from the circular block 10 leads to the instruction rectangular block 11 instructing the operator to clean the electrode, to increase of one step the time lapse between consecutive pulses (line B of table 4) and to restart the machine. The output from the instruction block 11 leads back to the circular block 3.

If the abnormal discharge indicator light is off, taking the output O from the circular block 10 leads to an instruction rectangular block 6a which gives the operator the same instruction as given by the instruction block 6.

In the event that machining is taking place, in which case the indicator lights mentioned in the circular blocks 8 and 10 are not continuously on, using the output I from the circular block 2 leads the operator consecutively to circular blocks 12, 13 and 14, which respectively ask consecutive questions as to whether or not the abnormal discharge detection light (circular block 12), the dielectric contamination detection light (circular block 13), and the short circuit detection light (circular block 14) are blinking. If the answers to those three questions are each in the negative, passing through the circular blocks 12, 13 and 14, via their respective outputs O, leads to an instruction block 15 instructing the operator to initiate a correction program consisting in decreasing of one step at a time the adjustment corresponding to line B of table 4, i.e. instructing the operator to decrease the time lapse between two consecutive pulses. The instruction block 15 in turn leads to a circular block 16 asking whether all the indicator lights mentioned at circular blocks 12, 13 and 14 are still off after a few seconds of operation. If the answer to that question is in the affirmative, the output I from the circular block 16 leads the operator back to the input of the instruction block 15 instructing him to decrease once again of one step the time lapse between consecutive pulses. As soon as such an adjustment causes blinking of one of the indicator lights identified at the circular blocks 12 through 14, taking the output O from the circular blocks 16 leads to an instruction block 17 requesting the operator to increase of one step the time interval between consecutive pulses. The instruction block 17 leads to the circular block 18 which once again requests the operator to check whether or not one of the lights mentioned at circular blocks 12 through 14 is blinking. If none of the lights is blinking, the negative output O from the circular block 18 leads to an instruction block 19 instructing the operator to decrease the work gap to its minimum value that does not cause blinking of one of said indicator lights. In this manner, the best machining conditions are obtained, which is the result indicated by the instruction block 20.

However, if one or more of the indicator lights mentioned at circular block 12 through 14 is blinking, the affirmative output I from the circular block 18 leads back by arrowed line L to the input of circular block 12. If, for example, only the indicator light relative to short circuits is blinking, passing through circular blocks 12 and 13 leads to circular block 14 which leads to an instruction block 21 instructing the operator to take the corrective measure of increasing the work gap. After such a corrective measure is taken, the output of the instruction block 21 leads back, through arrowed line L, to the input of the circular block 12, to start the checking cycle all over again.

In the event that the indicator light corresponding to the check requested by the circular block 13 is blinking, which indicates excessive contamination of the dielectric fluid, the affirmative output I from the circular block 13 leads to a circular block 14a requesting a check of the indicator light which indicates the occurrence of short circuits. According to whether the short circuit indicator light is off or on, taking the negative output O or the affirmative output I from the circular block 14a leads respectively to the series of instruction blocks 22, 23 and 24 or to the series of instruction blocks 22a, 23a, 24a and 21a, before returning back to the input circular block 12 by way of the arrowed line L.

The consecutive instruction blocks at the output O and at the output I from the circular block 14a instruct, respectively, the operator to initiate appropriate programs of corrective measures, which are as follows:

The instruction block 22 instructs the operator to increase the flow rate of the dielectric fluid according to line D of table 4. The instruction block 23 instructs the operator to increase of one step the time lapse between consecutive pulses according to line B of table 4. The instruction block 24 instructs the operator to actuate the pulsator, in the event that the pulsator is in action, toward a decrease of the ratio between the machining duration and non-machining duration. The latter corrective measure may be effected either by increasing the period of time during which the electrode is retracted from the workpiece, or by decreasing the period of time during which the electrode is positioned relatively to the workpiece such as to effectuate a machining operation, or by a combination of both.

The instruction blocks 22a through 24a, led to by taking the affirmative output I from the circular block 14a, are designed to give the same consecutive sets of instruction to the operator as given by the instruction blocks 22 through 24. The instruction block 21a is the same as the instruction block 21, such that in addition to increasing the flow rate of the dielectric fluid, increasing of one step the time lapse between consecutive pulses and adjusting the action of the pulsator, the operator is further instructed by instruction block 21a to increase the machining gap.

In the event that the indicator light indicating abnormal discharges is blinking, the affirmative output I from the circular block 12 leads to a circular block 13a having a negative output O leading to a circular block 14b and an affirmative output I leading to a circular block 14c. The circular blocks 13a, 14b and 14c request the operator to effectuate the same checks as requested by the circular blocks 13 and 14. The same numeral designation for the diverse remaining circular blocks (questions) and rectangular blocks (instructions) correspond to the same checks and corrective measures or programs as precedently mentioned relative to the circular blocks and rectangular instruction blocks of the same numeral designation, the alphabetical suffix, such as *a*, *b* and *c* being used to differentiate one circular block from another and one instruction block from another.

In this manner, the negative output O from the circular block 14b leads to the instruction block 23b, while the affirmative output I leads to the instruction blocks 23c and 21b, and the negative output O from the circular block 14c leads to the consecutive instruction blocks 22b, 23d and 24b, while the affirmative output I from the circular block 14c leads to the consecutive instruction blocks 22c, 23c, 24c and 21c, before returning the operator once again to the circular block 12.

It can thus be seen that the checking and corrective measure system hereinbefore described and illustrated at FIG. 1 relates to a graphic representation of a program to be followed by the user of an EDM machine in order to obtain the most efficient and most practical adjustment of the machine controls for achieving the best operation parameters for the machine.

Figure 2:
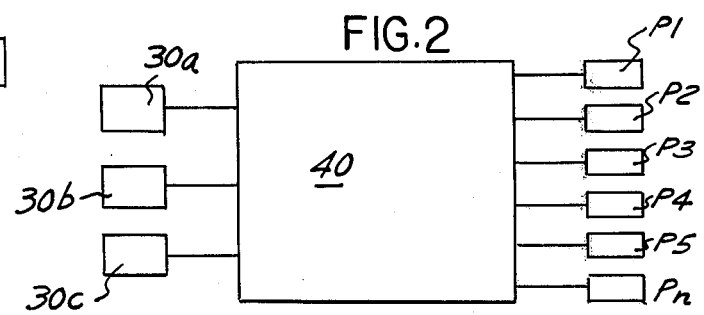
FIG. 2 is a simplified block diagram of a logic circuit according to the present invention.

FIG. 2 illustrates the general arrangement of an electrical circuit for automatically controlling particular programs of corrective measures as a function of the diverse machining fault conditions which are detected. The circuit comprises, for example, three detectors 30a, 30b and 30c for the purpose of detecting machining faults which are designated, for example, by faults *a*, *b* and *c*. Each of the detectors 30a, 30b and 30c is adapted to monitor the function of an appropriate element of an EDM machine consisting, as is well known, of a base on which is mounted a workpiece W disposed in a tank T filled with an appropriate dielectric fluid such as oil or kerosene kept in constant circulation by means of a pump P. An electrode E is fed by way of an appropriate servo system S towards the workpiece W, and electrical discharges obtained from a pulse generator G connected across the electrode tool E and workpiece W are applied across the work gap formed between the electrode tool and the workpiece. As shown symbolically by means of arrowed dash lines, the detector 30a detects, for example, the presence of abnormal electrical discharges, the detector 30b detects the contamination of the dielectric fluid and the detector 30c detects the occurrence of short circuits at the work gap. The signals at the output of the detectors 30a, 30b and 30c are applied to a logic circuit 40 which can take the form, for example, of a program coordinator adapted to initiate one or more consecutive corrective measures, each group of correcting measures being designated by a program block $P_I$ through $P_n$.

Figure 3:
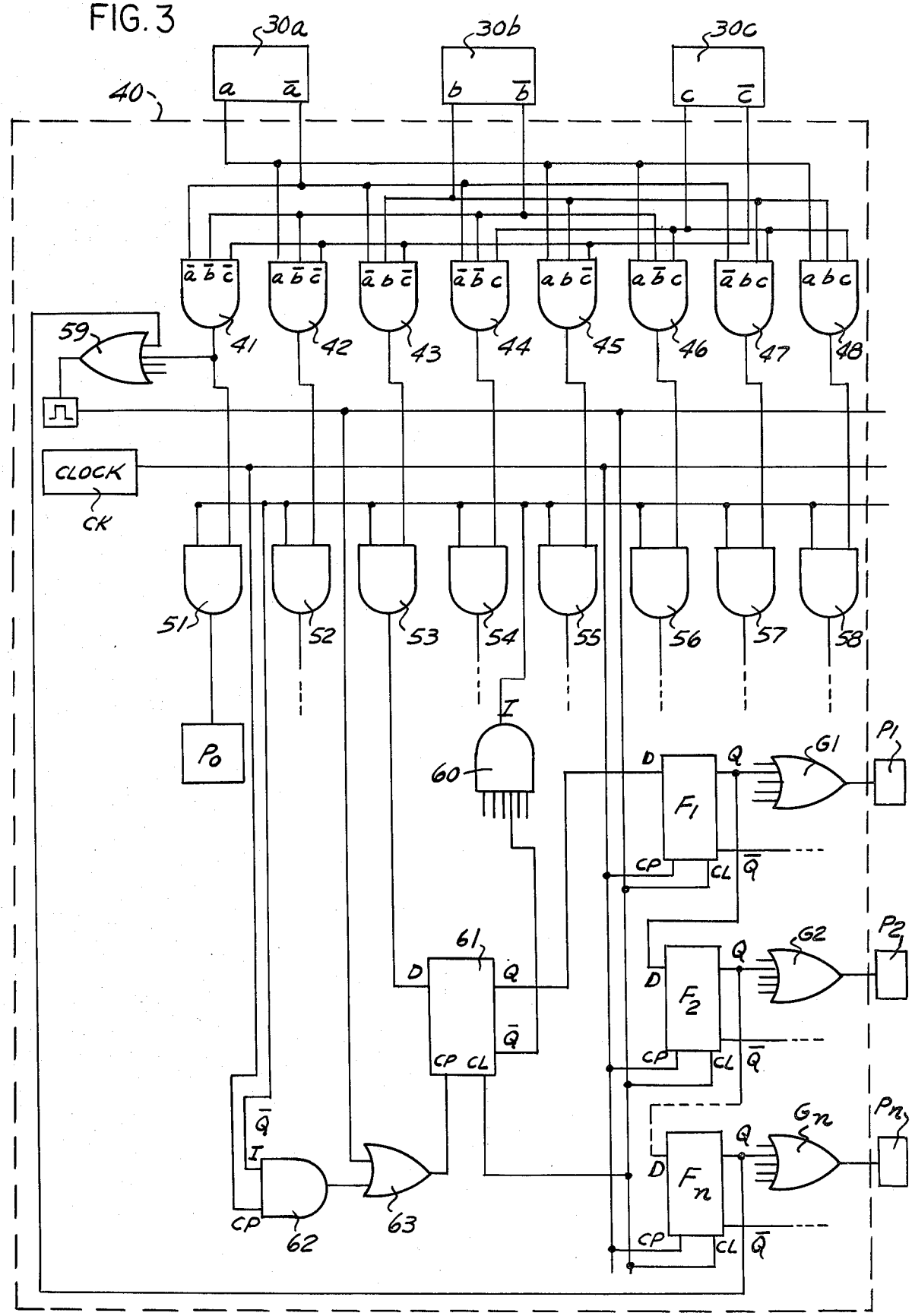
FIG. 3 is a more detailed schematic circuit diagram of the embodiment of FIG. 2.

FIG. 3 represents in more detail the schematic diagram of such a logic circuit which may be made part of the control system of the electro-erosion machining apparatus.

As shown at FIG. 3, the system is designed to monitor, for example, three machining parameters which are each representative of a particular fault in the machining conditions. The system therefore comprises three detectors 30a, 30b and 30c for monitoring each one of the machining parameters and each provided with two outputs corresponding respectively to the existence or absence of a particular machining fault, the existence or absence of such fault being designated by a and $\bar{a}$, b and $\bar{b}$, and c and $\bar{c}$, respectively.

In the absence of a fault detected by detector 30a, the detector supplies a signal O at its output a and a signal I at its output $\bar{a}$. In the event that the detector 30a detects a fault, the output signals are reversed, and its output a supplies a signal I while its output $\bar{a}$ supplies a signal O. The detectors 30b and 30c are similarly provided with respectively outputs b and $\bar{b}$ and c and $\bar{c}$, supplying appropriate signals according to whether or not a fault is detected by each detector.

The logic circuit 40 comprises eight AND gates, designated by numerals 41 through 48, each having three inputs individually connected to an output of the detectors in such manner that the AND gate 41 supplies an output for the condition $\bar{a}.\bar{b}.\bar{c}$, the AND gate 42 supplies an output under the condition $a.\bar{b}.\bar{c}$, and so on as indicated in the diagram of FIG. 3, the AND gate 48 supplying an output only if all three detectors detect a fault in each of the three chosen parameters, therefore under the condition $a.b.c$.

Each one of the AND gates 41 through 48 has its output connected to one of the two inputs of an AND gate 51 through 58, the other input of the AND gate being connected to a common line continuously placed to a voltage I obtained from the output of an AND gate 60. Consequently, as long as the level or signal I is present at one of the inputs of any one of the AND gates 51 through 58, an output signal appears at the output of that AND gate when a signal is applied to the other input of the gate. The logic cirucit 40 of FIG. 3 is shown in a simplified manner in which the only circuit fully illustrated is that relative to the AND gate 53. The following description therefore will concern itself with the operation of the logic system of the invention with respect to the monitoring of the conditions of operation of an EDM machine and with respect to the corrective measure program controlled by the AND gate 53, and it will be appreciated that the operation of the logic circuit of the invention and the description hereinafter is applicable to all the elements controlled by the AND gates 51 through 58.

The single circuit illustrated in details relates to the detection of the conditions $\bar{a}.b.\bar{c}$, as detected by the detectors 30a, 30b and 30c supplying appropriate outputs to the inputs of the AND gate 43. Such a condition results from the detection of a single fault corresponding to the fault b. Such a fault, as previously indicated, is the presence of excessive contamination of the dielectric fluid.

Under such conditions, the AND gate 43 is the only one of the AND gates 41 through 48 which supplies an output. The output from the AND gate 43 is applied to one of the two inputs of the AND gate 53. As long as the signal I is present at the other input of the AND gate 53, a signal is applied from the output of the AND gate 53 connected to the input D of a memory flip-flop 61 set by clock pulses applied to its terminal CP.

The flip-flop 61 has two outputs designated respectively by Q, indicating a corrective measure, and $\bar{Q}$, indicating the absence of a corrective measure. The flip-flop 61 is reset by pulses applied to its terminal CL as will be explained hereinafter.

The clock pulses applied to the terminal CP of the flip-flop 61 are obtained from a pulse generator or clock CK through an AND gate 62, the output of which is connected to one of the two inputs of an OR gate 63, the output of which is in turn connected to the terminal CP of the flip-flop 61. The other input of the AND gate 62 is supplied with the voltage level I, indicating a condition $\bar{Q}$, as long as such voltage level I appears at the output of the AND gate 60, i.e., in the absence of a program of correction being in the course of being executed. The OR gate 63 applies to the terminal CP of the flip-flop 61 either the clock pulse or the pulse appearing at the output of an OR gate 59 having an input connected to the output of the AND gate 41 which supplies an output only when the condition $\bar{a}.\bar{b}.\bar{c}$ is present, in other words when no fault is detected by detectors 30a, 30b and 30c. When set, the flip-flop 61 supplies at its output Q a signal corresponding to the signal applied to its input D, and remains in that state as long as a reset signal is not applied to its terminal CL. When a subsequent pulse is applied to the input D of the memory flip-flop 61, a pulse appears at its output Q which is applied to the input D of a flip-flop $F_1$. The signal appearing at the output Q of the flip-flop $F_1$ initiates, through an OR gate $G_1$, the start of a correction program $P_1$. The next pulse causes the flip-flop $F_2$ to provide an output Q which, through an OR gate $G_2$, initiates the start of a correction program $P_2$. The several flip-flops $F_I$ through $F_n$ have their respective inputs D and outputs Q arranged in cascade such that the next pulse appearing at the output Q of one flip-flop is applied to the input D of the next flip-flop, the output of which in turn triggers through the OR gates $G_I$ through $G_n$ the initiation of the next program of correction, as shown at $P_I$ through $P_n$. Each successive pulse, in this manner, initiates successive correction programs, until the last flip-flop $F_n$ is activated to control by means of its output Q through the OR gate $G_n$ the initiation of the last correction program $P_n$. The output Q from the last flip-flop $F_n$ supplies through the OR gate 59 a pulse which is applied to the terminal CL of all the flip-flops to reset all the flip-flops.

When none of the detectors 30a, 30b or 30c detects a fault, there results a signal I at the output $\bar{a}$, $\bar{b}$ and $\bar{c}$ of the detectors, such that only the AND gate 41 is supplying an output. The output of the AND gate 41 is also connected to one of the inputs of the OR gate 59, such that a reset signal appears at the output of the OR gate 59 resetting all the flip-flops $F_l$ through $F_n$, which results in interrupting any and all correction programs in the course of being executed.

The signal appearing at the output of the AND gate 41 is also applied to the input of the AND gate 51. The signal appearing at the output of the AND gate 51 is utilized to trigger the initiation of a program $P_o$ which corresponds to the programs illustrated by the instruction blocks 15 and 16 of FIG. 1, i.e. to control a decrease of the duration between two consecutive machining pulses, and to check, after a delay of a few seconds, whether there is any apparent machining fault. In the absence of a fault, the time lapse between two consecutive machining pulses is further reduced, and this operation is repeated until a fault is detected by any one of the detectors 30a, 30b and 30c. It is evident that it is only when an appropriate level or signal appears at the output $\bar{Q}$ of all of the flip-flops that a level I appears at the output of the AND gate 60, such output level I being in turn applied to one of the inputs of all the AND gates 52 through 58. Therefore, it is only when no program of correction is in the course of being executed that any one of the gates 51 through 58 is capable of passing a signal from the output of one of the corresponding AND gates 41 through 48.

Having thus described the invention by way of typical practical examples thereof, what is claimed as novel and sought to be protected by U.S. Letters Patent is as follows:

1. Method for monitoring and adjusting the operation of an electro-erosion machining apparatus, said apparatus comprising an electrical pulse generator for applying to a work gap between an electrode tool and a workpiece a series of electrical pulses causing electrical discharges to occur through said work gap immersed in an appropriate fluid, said method comprising:

monitoring at least a pair of selected machining conditions comprising presence or absence of abnormal electrical discharges and presence or absence of excessive fluid contamination until monitoring detects the presence of at least one abnormal condition;

initiating a sequence of predetermined correction programs each correction program comprising a series of progressive increments for correcting the conditions observed during said monitoring and said sequence comprising the step of:

increasing the flow of fluid to said work gap, increasing the time lapse between consecutive pulses, and increasing the work gap between the electrode tool and the workpiece;

repeating said monitoring; and initiating after each monitoring step each of said correction programs until monitoring indicates the absence of defects in both selected conditions of operation.

2. Method according to claim 1 wherein said apparatus further comprises means for periodically momentarily retracting the electrode tool, said method further comprising the step of:

controlling the electrode tool retraction so as to decrease the ratio of the duration of machining periods to the duration of non-machining periods, said non-machining periods corresponding to the momentary retractions of said electrode tool.

3. Method for monitoring and adjusting the operation of an electro-erosion machining apparatus, said apparatus comprising an electrical pulse generator for applying to a work gap between an electrode tool and a workpiece a series of electrical pusles causing electrical discharges to occur through said work gap immersed in an appropriate fluid, said method comprising:

monitoring at least a pair of selected machining conditions comprising presence or absence of abnormal electrical discharges and presence or absence of short circuits at the work gap until monitoring detects the presence of at least one abnormal condition;

initiating a sequence of predetermined correction programs, each correction program comprising a series of progressive increments for correcting the conditions observed during said monitoring and said sequence comprising the steps of:

increasing the flow of fluid to said work gap, increasing the time lapse between consecutive pulses, and increasing the work gap between the electrode tool and the workpiece;

repeating said monitoring; and initiating after each monitoring step each of said correction programs until monitoring indicates the absence of defects in both selected conditions of operation.

4. Method according to claim 3 wherein said apparatus further comprises means for periodically momentarily retracting the electrode tool, said method further comprising the step of:

controlling the electrode tool retraction so as to decrease the ratio of the duration of machining periods to the duration of non-machining periods, said non-machining periods corresponding to the momentary retractions of said electrode tool.

5. Method for monitoring and adjusting the operation of an electro-erosion machining apparatus, said apparatus comprising an electrical pulse generator for applying to a work gap between an electrode tool and a workpiece a series of electrical pulses causing electrical discharges to occur through said work gap immersed in an appropriate fluid, said method comprising:

monitoring at least a pair of selected machining conditions comprising presence or absence of excessive fluid contamination and presence or absence of short circuits at the work gap until monitoring detects the presence of at least one abnormal condition;

initiating a sequence of predetermined correction programs, each correction program comprising a series of progressive increments for correcting the conditions observed during said monitoring and said sequence comprising the steps of:

increasing the flow of fluid to said work gap, increasing the time lapse between consecutive pulses, and increasing the work gap between the electrode tool and the workpiece;

repeating said monitoring; and initiating after each monitoring step each of said correction programs until monitoring indicates the absence of defects in both selected conditions of operation.

6. Method according to claim 5 wherein said apparatus further comprises means for periodically momentarily retracting the electrode tool, said method further comprising the step of:

controlling the electrode tool retraction so as to decrease the ratio of the duration of machining periods to the duration of non-machining periods, said non-machining periods corresponding to the momentary retractions of said electrode tool.

7. Method for monitoring and adjusting the operation of an electro-erosion machining apparatus, said apparatus comprising an electrical pulse generator for applying to a work gap between an electrode tool and a workpiece a series of electrical pulses causing electrical discharges to occur through said work gap immersed in an appropriate fluid, said method comprising:

monitoring at least three selected machining conditions comprising presence or absence of abnormal electrical discharges, presence or absence of excessive fluid contamination, and presence or absence of short circuits at the work gap, and in the event of the absence of defects in the selected machining conditions further comprising initiating a program comprising the steps of:

progressively decreasing by increments the time lapse duration between consecutive pulses until the appearance of at least one of the defects in the selected conditions of operation;

increasing of one increment said time lapse duration for causing the disappearance of said defect;

progressively decreasing by increments the work gap until the appearance of at least one of said defects; and increasing said work gap of the increment necessary to cause the disappearance of said defect.

8. Method according to claim 7 wherein said apparatus further comprises means for periodically momentarily retracting the electrode tool, said method further comprising the step of:

controlling the electrode tool retraction so as to increase by increments the ratio of the duration of machining periods to the duraction of the non-machining periods, said non-machining periods corresponding to the momentary retractions of said electrode tool.

* * * * *

UNITED STATES PATENT OFFICE
CERTIFICATE OF CORRECTION

Patent No. 3,912,898     Dated October 14, 1975

Inventor(s) Jean Pfau et al

It is certified that error appears in the above-identified patent and that said Letters Patent are hereby corrected as shown below:

Column 1, line 49, "lectirc" should be --lectric--.

Column 3, line 46, "B" should be --E--.

Column 10, line 10, "pusles" should be --pulses--.

Column 12, line 21, "duraction" should be --duration--

Signed and Sealed this sixth Day of January 1976

[SEAL]

Attest:

RUTH C. MASON
Attesting Officer

C. MARSHALL DANN
Commissioner of Patents and Trademarks